United States Patent

[11] 3,577,833

[72] Inventor Darold M. Skelton
Brookfield, Wis.
[21] Appl. No. 841,018
[22] Filed July 11, 1969
[45] Patented May 4, 1971
[73] Assignee Milwaukee Cylinder Corporation
Cudahy, Wis.

[54] FLUID CYLINDER
3 Claims, 2 Drawing Figs.
[52] U.S. Cl. .................................................. 92/168,
277/102, 277/187
[51] Int. Cl. ..................................................... F16j 15/16,
F16j 15/18
[50] Field of Search .......................................... 92/168,
165, 169, 171; 277/35, 102, 187; 123/193 (C),
193 (CH), 193 (H)

[56] References Cited
UNITED STATES PATENTS
| | | | |
|---|---|---|---|
| 770,016 | 9/1904 | Miller ........................... | 92/165 |
| 3,153,539 | 10/1964 | Flick ............................ | 92/168X |
| 3,186,724 | 6/1965 | Wheatley ..................... | 277/187X |

Primary Examiner—Martin P. Schwadron
Assistant Examiner—Allen M. Ostrager
Attorney—James E. Nilles ABSTRACT: A fluid cylinder having an end cap and a retainer plate for the end cap for containing packing thereby permitting a simplified bushing to be inserted in the end cap insuring that the entire bearing surface of the bushing is lubricated.

Patented May 4, 1971

3,577,833

Inventor:
Darold M. Skelton
By: James E. Nilles
Attorney

3,577,833

FLUID CYLINDER

BACKGROUND OF THE INVENTION

Prior art fluid cylinder devices usually have a bushing member in the end cap and in which the piston rod slides, and suitable packing is provided in the end cap for mounting a seal around the rod. In these prior art devices, only a portion of the bushing could be lubricated due to the location of the packing within the end cap. Furthermore, the bushing usually had to be formed in a rather intricate shape which required considerable machining and this of course, was costly. Furthermore, when it was desired to replace the packing in these prior art devices, the alignment of the bushing was usually disturbed.

SUMMARY OF THE INVENTION

The present invention provides a fluid cylinder having an end cap in which a simple bushing of rectangular cross section is located. A retainer plate is secured to the end of the end cap and has a counterbore for containing the packing. The arrangement is such that the packing does not wipe the lubricant from the bushing surface, but instead, the entire bearing surface of the bushing is kept lubricated for engagement by the piston rod. As a result, the manufacture of the bushing is simplified and requires only straight machinery operations. Furthermore, when the packing is to be replaced, it is not necessary to disturb the alignment of the bushing in the end cap.

These and other objects and advantages of the present invention will appear hereinafter as this disclosure progresses, reference being had to the accompanying drawings.

DESCRIPTION OF THE PREFERRED EMBODIMENT

Figure 1:
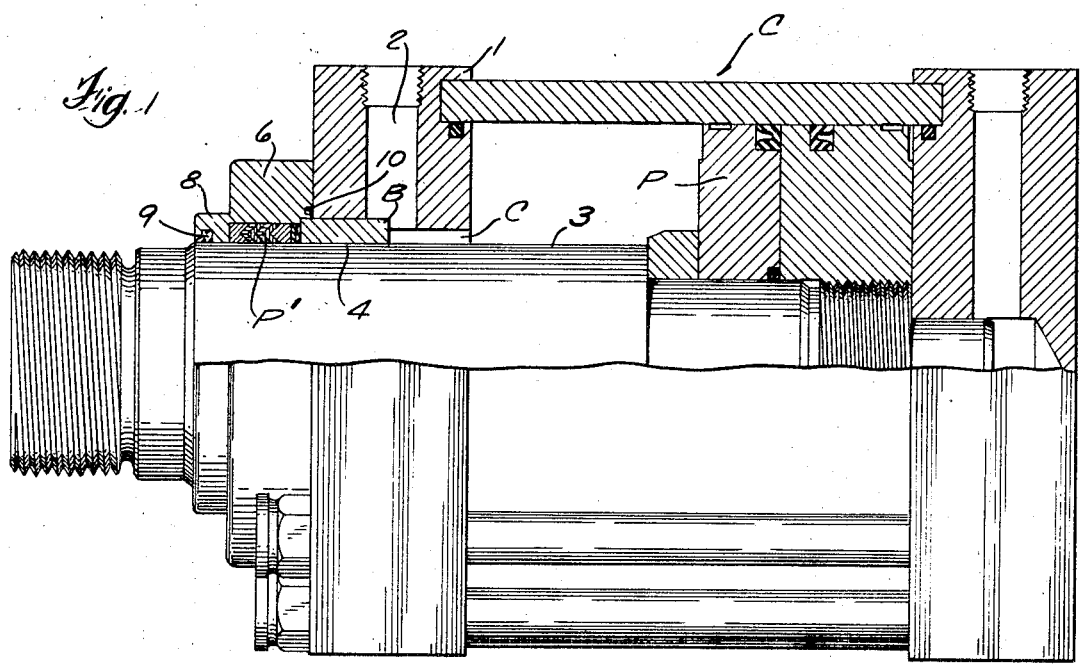
FIG. 1 is a longitudinal, cross-sectional view of a fluid cylinder embodying the present invention.
Figure 2:
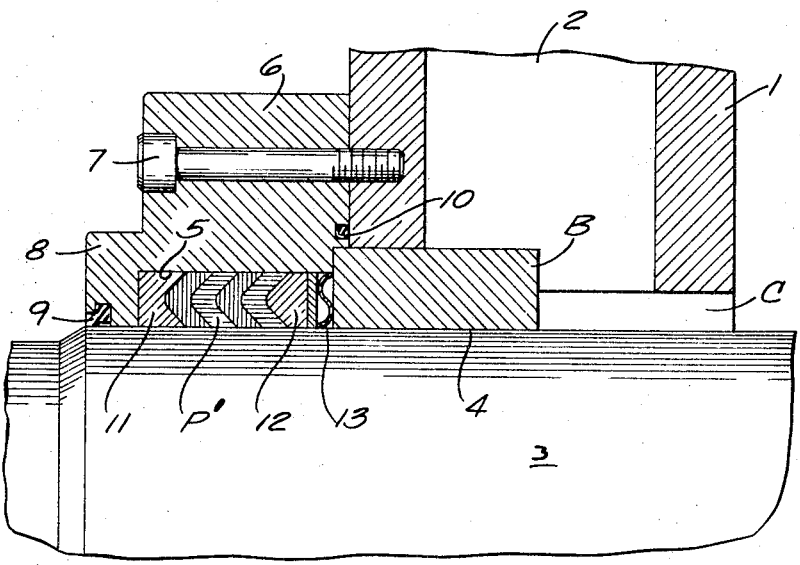
FIG. 2 is an enlarged cross-sectional view of a portion of the cylinder shown in FIG. 1.

A cylinder C has an end cap 1 fixed thereto and a port 2 extends through the end cap so that pressure fluid may be introduced through the interior of the cylinder. A piston P is adapted to reciprocate within the cylinder in the known manner. The end cap is usually formed of a relatively soft steel and therefore, it is usual to provide a bushing B in the end cap and against which the piston can bear.

In accordance with the present invention, a bushing B of simple rectangular form is press fitted into the end cap in a precise manner and has a rather long bearing surface 4 for engagement with the piston rod 3. The position of the bushing must be precise within the cylinder and once made should preferably not be disturbed.

Packing is provided for maintaining a sealing relationship between the piston rod and cylinder and this packing sometimes needs replacement as it becomes worn.

In accordance with the present invention, the packing P is provided in a counterbore 5 of a retainer plate 6 so that the packing surrounds the piston rod and wipes it clean as the piston rod moves relative to the packing. Such a wiping action has heretofore prevented the entire surface 4 of the bushing from being lubricated, and it is highly desirable to keep such a surface well lubricated to prevent wear and permit smooth functioning of the unit.

More specifically, the retainer plate is secured by cap screws 7 to the end cap and has an annular end flange 8 which extends radially inwardly past the gaskets. A suitable wiper 9 is provided in the flange 8 and an O-ring seal 10 is also provided to maintain a sealing relationship between the retainer plate and end cap. Retaining rings 11 and 12 of suitable configuration are provided, one on each side of the packing so as to hold the packing in proper position in the counterbore 5. A wave spring 13 bears against the ring 12 and against the bushing so as to hold the packing in tightly assembled relationship.

By locating the gaskets in the separate retainer plate, and not utilizing any of the axial length of the end cap for this purpose, a bushing of simple configuration and good axial length can be utilized in the end cap; and the gasket material instead is located in the retainer plate and relative to the bushing so that the entire surface 4 of the bushing is maintained wet.

In order to remove the packing for replacement or inspection, it is only necessary to remove the cap screws 7 and thus, permit ready removal of the retainer plate and complete disassembly of the packing rings and gaskets. It is unnecessary to disturb the positioning of the bushing B in disassembling or then again assembling the device.

I claim:

1. In a fluid cylinder of the type having a bore in which a piston is axially slideable, said piston having an attached rod, an end cap rigidly secured at one end of said cylinder, said end cap having a counterbore, a bushing inserted in said counterbore, said bushing having an internal surface for engagement by said piston rod, a retainer plate adapted to be secured on the end of said end cap and adjacent said bushing, said retainer plate having an internal counterbore and an axial flange at the outer end thereof, packing means located in said counterbore of said retainer plate and between said flange and said bushing whereby said packing means is contained within said retainer plate so as to be in sealing relationship with said piston rod, said retainer plate having another counterbore, and said bushing is of generally rectangular cross-sectional shape and extends into said another counterbore in said retainer plate.

2. A device as set forth in claim 1 including spring means in said end cap counterbore for holding said packing in sealing relationship.

3. A fluid cylinder having a piston slideable therein, said piston having an attached rod, an end cap rigidly secured at one end of said cylinder, said end cap having a central counterbore at its end opposite said cylinder, a ring bushing of generally rectangular cross section and inserted in said counterbore, said bushing having an internal cylindrical surface for engagement by said piston rod, a retainer plate adapted to be secured on the end of said end cap at said end opposite said cylinder, said retainer plate having an internal counterbore and an axial flange at the outer end thereof, packing means located in said counterbore of said retainer plate, said retainer plate having a second counterbore, said bushing extending into said second counterbore of said retainer plate, spring means in said end cap counterbore and between said packing and bushing for holding said packing in sealing relationship, whereby said packing means is contained within said retainer plate so as to be in sealing relationship with said piston rod.